(12) United States Patent
Wang et al.

(10) Patent No.: US 12,435,625 B1
(45) Date of Patent: Oct. 7, 2025

(54) SERVICE TABLE FOR POLLING DATA OF DOWNHOLE TRANSMISSION DEVICE IN MEASUREMENT-WHILE-DRILLING (71) Applicant: Institute of Geology and Geophysics, Chinese Academy of Sciences, Beijing (CN)

(72) Inventors: Yuliang Wang, Beijing (CN); Wenxiu Zhang, Beijing (CN); Qihui Zhen, Beijing (CN); Jiansheng Du, Beijing (CN); Jing Ou, Beijing (CN); Xinzhen He, Beijing (CN); Jiwen Xiao, Beijing (CN); Hui Wu, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/912,567

(22) Filed: Oct. 10, 2024

(30) Foreign Application Priority Data

Aug. 26, 2024 (CN) .......................... 202411173778.2

(51) Int. Cl.
*E21B 47/13* (2012.01)
*E21B 47/008* (2012.01)
(52) U.S. Cl.
CPC ............ *E21B 47/13* (2020.05); *E21B 47/008* (2020.05)
(58) Field of Classification Search
None
See application file for complete search history.

(56) References Cited

U.S. PATENT DOCUMENTS

| | | | | |
|---|---|---|---|---|
| 5,774,420 A * | 6/1998 | Heysse | .................. | E21B 47/18 340/854.3 |
| 8,024,121 B2 * | 9/2011 | Tang | ...................... | E21B 47/12 702/6 |
| 2002/0163441 A1 * | 11/2002 | Hill | ........................ | G01V 11/00 340/854.3 |
| 2007/0057811 A1 * | 3/2007 | Mehta | ..................... | E21B 47/12 340/853.3 |
| 2015/0275656 A1 * | 10/2015 | Holt | ........................ | E21B 47/12 340/855.4 |
| 2016/0003035 A1 * | 1/2016 | Logan | ...................... | H04B 3/54 340/854.6 |
| 2018/0095912 A1 * | 4/2018 | Vettical | ................. | E21B 47/008 |

* cited by examiner

Primary Examiner — Lina Cordero (57) ABSTRACT

A service table for polling data of downhole transmission devices in MWD includes a frame number, a number of data items of a data frame, a number of cycles of the data frame in a polling process, a device address of each of the data items, a measurement parameter, a valid bit number, a valid byte number of the data frame, a total frame number, a total polling frame number H and a total polling frame number L, an error polling frame number H and an error polling frame number L, and a transmission status bit flag. The service table architecture for polling data of a downhole transmission device in MWD has been used in actual drilling devices and has completed field operations for multiple wells. Compared to the simplified service tables in the past, the service table can support multiple downhole transmission devices working simultaneously, which has improved drilling efficiency and saved drilling costs.

2 Claims, 4 Drawing Sheets

| Frame number | number of data item | number of cycles in a polling process | Data 1 | | | ... | Data 10 | | |
|---|---|---|---|---|---|---|---|---|---|
| | | | device address of the data items | measurement parameter | valid bit number | | device address of the data item | measurement parameter | valid bit number |
| Frame number 0 | number of data item | number of cycles in a polling process | device address of the data items | measurement parameter | valid bit number | ... | device address of the data item | measurement parameter | valid bit number |
| Frame number 1 | number of data item | number of cycles in a polling process | device address of the data items | measurement parameter | valid bit number | ... | device address of the data item | measurement parameter | valid bit number |
| Frame number N | number of data item | number of cycles in a polling process | device address of the data items | measurement parameter | valid bit number | ... | device address of the data item | measurement parameter | valid bit number |
| a total frame number | a total polling frame number H | a total polling frame number L | an error polling frame number H | an error polling frame number L | transmission status bit flag | | | | |

| Frame number | number of data item | number of cycles in a polling process | Data 1 | | | ... | Data 10 | | |
|---|---|---|---|---|---|---|---|---|---|
| | | | device address of the data items | measurement parameter | valid bit number | | device address of the data item | measurement parameter | valid bit number |
| Frame number 0 | number of data item | number of cycles in a polling process | device address of the data items | measurement parameter | valid bit number | ... | device address of the data item | measurement parameter | valid bit number |
| Frame number 1 | number of data item | number of cycles in a polling process | device address of the data items | measurement parameter | valid bit number | ... | device address of the data item | measurement parameter | valid bit number |
| Frame number N | number of data item | number of cycles in a polling process | device address of the data items | measurement parameter | valid bit number | ... | device address of the data item | measurement parameter | valid bit number |
| a total frame number | a total polling frame number H | a total polling frame number L | an error polling frame number H | an error polling frame number L | transmission status bit flag | | | | |

SERVICE TABLE FOR POLLING DATA OF DOWNHOLE TRANSMISSION DEVICE IN MEASUREMENT-WHILE-DRILLING

TECHNICAL FIELD

The disclosure relates to the field of geology, and particularly to a service table for polling data of a downhole transmission device in measurement-while-drilling (MWD).

BACKGROUND

MWD allows for a timely acquisition of formation information such as natural gamma, formation resistivity, and neutron porosity during a drilling process. Compared to wireline logging, MWD offers better real-time performance, higher efficiency, and more accurate data. The types of MWD devices are diverse, mainly including a downhole transmission device, a MWD measuring device, a MWD logging device, and a rotary steerable device. These devices form an MWD device assembly through a downhole bus, with the rotary steerable device at a bottom of the MWD device assembly configured to drill forward. The MWD measuring device and the MWD logging device are connected above the rotary steerable device to determine drilling attitude data and acquire formation data. The downhole transmission device is disposed at a top of the MWD device assembly, configured for data exchange between the downhole and ground. The drilling attitude data and the formation data uploaded to the ground by the downhole transmission device all come from other devices of the downhole transmission device assembly, and different devices provide data with various data types. In particular, the MWD logging devices includes devices such as azimuthal electromagnetic wave logging devices and azimuthal acoustic wave logging devices, and depending on the measured azimuth or physical quantity, a single device can measure data with dozens of types. Depending on different formations and well conditions, the data requirements during the drilling process also vary. Facing the data with multitude and complexity of data types, how to validly integrate the data, reduce invalid code elements, and make the data flexibly selectable for upload is key to improving drilling efficiency and saving drilling costs.

The acquisition of various data from multiple devices in the MWD device assembly is completed by a downhole control unit, which polls the downhole transmission devices through a service table built in the downhole control unit to obtain various types of data. Currently, components of the MWD device assembly in some oilfields are relatively simple, and generally, the MWD device assembly includes an attitude measuring device and a downhole transmission device for completing drilling, so an architecture of the service table is relatively simple, and only fixed attitude information such as an inclination (also referred to as well deviation), an azimuth, and a tool face (TF) is needed to be unloaded. When the number of devices in the MWD device assembly increases and a type number of data to be acquired increases, the simple architecture of the service table cannot meet the requirements. Moreover, depending on different device combinations and different formation parameters, the data to be uploaded also varies. There is a need for more flexible selection and combination of the data to be uploaded. For example, when the MWD device assembly includes an azimuthal resistivity device and an azimuthal acoustic wave device, in addition to uploading attitude information such as an inclination, an azimuth, and a tool face, it is also necessary to upload resistivity data and acoustic wave data corresponding to different azimuths. How to combine and integrate these data requires those skilled in the art to configure based on the actual situation on the site, thus requiring a more complex service table architecture to meet field requirements.

SUMMARY

In order to solve the above problems, a service table for polling data of a downhole transmission device in MWD is provided, which can be applied to a more complex device assembly.

Technical solutions of the disclosure are as follows:

A service table for polling data of a downhole transmission device in MWD includes service table configuration information.

The configuration information of the service table includes a frame number, a number of data items of a data frame, a number of cycles for the data frame in a polling, device address of each of the data items, a measurement parameter, a valid bit number, a valid byte number of the data frame, a total frame number, a total polling frame number H and a total polling frame number L, an error polling frame number H and an error polling frame number L, and a transmission status bit flag. H represents high byte, and L represents low byte. The frame number is configured to identify a data frame for downhole transmission. The number of data items of the data frame is configured to indicate the number of the data items configured for the data frame and configured for uploading. The number of cycles for the data frame in the polling process is configured to indicate a number of times of sending the data frame to the downhole transmission devices for uploading the data frame to a ground device during the polling process. The device address of each of the data items is configured to identify a target underground device of the downhole transmission devices from which the data item is obtained. The measurement parameter is configured to indicate a parameter of the target underground device corresponding to the data item. The valid bit number is configured to indicate a bit number of the data item after discarding a high-order invalid zero of the data item. The valid byte number of the data frame is configured to indicate and encapsulate a byte number of the data frame after the data frame is concatenated, compressed. The total frame number is configured to indicate a total number of data frames configured in the service table, and configured to determine a number of data frames in the polling process. The total polling frame number H and the total polling frame number L are configured to record a number of data frames sent to the downhole transmission devices for polling monitoring by a central controller. The error polling frame number H and the error polling frame number L are configured to record a number of data frames with polling errors for the polling monitoring by the central controller. The transmission status bit flag is configured to indicate whether a working status of the downhole transmission devices needs to be uploaded, and configured to determine whether there is a fault; wherein a drilling process is stopped when the fault is detected.

In an embodiment, each item of the configuration information is configured using one byte.

In an embodiment, the total polling frame number H, the total polling frame number L, the error polling frame number H and the error polling frame number L are configured as 0 before the downhole transmission devices are lowered into a well.

In an embodiment, the polling errors include polling device response timeout or polling device data reception error.

In an embodiment, the working status includes a downhole transmission device bus voltage, a downhole transmission device bus current, and whether the polling process performed by the central controller is normal.

A method for the polling data of the downhole transmission device in MWD is further provided and includes the steps as follows:

step 1, before the downhole transmission devices are lowered into a well, determining the data of the downhole transmission devices required for the drilling process; based on the data of the downhole transmission devices, configuring the service table and then downloading the service table into a read-only memory (ROM) of the central controller and saving the service table in the ROM;

step 2, after downloading the service table into the ROM of the central controller and saving the service table in the ROM, lowering the downhole transmission devices in the well to start the drilling process, followed by initiating the central controller to wait for a first data acquisition command from the downhole transmission devices, and upon receiving the first data acquisition command from the downhole transmission devices, taking a first data frame in the service table as a target data frame and performing step 3;

step 3, polling the data of the downhole transmission devices by the central controller according to the target data frame in the service table, beginning with a first data item that needs to be acquired of data items of the target data frame and ending with a last data item that needs to be acquired of the data items of the target data frame, sending instructions to the downhole transmission devices to request corresponding data one by one, and acquiring the data items of the target data frame from the downhole transmission devices;

step 4, after acquiring the data items of the target data frame, concatenating and integrating the data items of the target data frame according to a valid bit number of each of the data items of the target data frame and a valid byte number of the target data frame to obtain a target processed data frame;

step 5, after concatenating and integrating the data items of the target data frame to obtain the target processed data frame, encapsulating the target processed data frame according to a protocol to obtain a target encapsulated data frame, sending the target encapsulated data frame corresponding to the target data frame to the downhole transmission devices for uploading to the ground device; determining whether the polling process for the target data frame is completed, in response to the polling process for the target data frame being completed, recording a total polling frame number and an error polling frame number of the target data frame, and updating the total polling frame number and the error polling frame number in the service table;

step 6, after sending the target encapsulated data frame of the target data frame to the downhole transmission devices, waiting for, by the central controller, a second data request command from the downhole transmission device; upon receiving the second data acquisition command from the downhole transmission devices, taking each of remaining data frames after the target data frame in the service table as the target data frame and repeatedly performing the steps 3, 4, and 5 until all data frames in the service table are sent to the downhole transmission devices;

step 7, determining whether the working status of the downhole transmission devices is needed to be sent based on the configuration information in the service table; in response to the working status of the downhole transmission devices being needed to be sent, sending monitoring information comprising a downhole transmission device bus voltage, a downhole transmission device bus current, and whether the polling process performed by the central controller is normal; and step 8, taking a third data frame in the service table as the target data frame, and repeatedly performing the steps 3 to 7, without resending the first date frame and a second data frame, as pump startup sequences, in the service table.

Specifically, the data of the downhole transmission devices refers to the physical parameters measured by the downhole transmission in the well, (i.e., temperature, resistivity, etc.). The data of the downhole transmission devices by the central controller is a command sent according to a communication protocol between the central controller and the device assembly to request the data of the downhole transmission devices (i.e., the physical parameters measured by the downhole transmission, such as temperature, resistivity, etc.). The acquiring the data items of the target data frame from the downhole transmission devices is the physical quantity measured by the downhole transmission device (i.e., the physical parameters measured by the downhole transmission device, such as temperature, resistivity, etc.).

In an embodiment, when the service table is saved in the ROM, a frame header of each data frame in the service table, a byte number of the data frame in the service table, and a total byte number of the service table are not stored and are only used for auxiliary counting when the central controller downloads the service table. The first data frame with a frame number 0x00 and the second data frame with a frame number 0x01 are the pump startup sequences, which are uploaded only once after a downhole transmission device assembly is powered up; data frames from the third data frame with a frame number 0x02 to a last frame in the service table are cyclic sequences, and after the pump startup sequences are sent, the cyclic sequences are sent in a cyclic manner, repeatedly.

Compared with the related art, the disclosure has the following advantages:

(1) A maximum number of configured frame numbers can reach up to 256, addressing the issue of insufficient frame numbers for configuration when there are many devices in the device assembly.

(2) During drilling polling process, it is oriented towards the data that needs to be polled, and the service table configuration is more flexible. Different parameters of different devices can be flexibly combined for the configuration, which can greatly meet the different data needs of various well conditions and formations.

(3) The total number of devices in the device assembly can be configured up to 256, and the maximum number of configured measurement parameters for each device can reach 256, avoiding the problem of limited number of devices that can be connected in the device assembly and a limitation of configured parameters for a single device.

(4) The addition of configuration options for the valid bit number and the valid byte number in the data frame allows for the splicing and concatenation of multiple devices and multiple data, removing invalid bit positions, saving channel resources of the downhole transmission device, and greatly improving transmission efficiency.

(5) By configuring the total polling frame numbers, the error polling frame numbers, and determining whether to send status bits in the service table, it can validly monitor the status of the device during drilling process, preventing device damage and drilling accidents during the drilling process.

BRIEF DESCRIPTION OF DRAWINGS

The attached drawings generally illustrate various embodiments by way of example rather than limitation, and are used together with the specification and claims to explain the embodiments of the disclosure. At appropriate times, the same reference numerals in all figures are used to refer to the same or similar parts. Such embodiments are illustrative and not intended to be exhaustive or exclusive embodiments of devices or method in the disclosure.

DETAILED DESCRIPTION OF EMBODIMENTS

It should be noted that the embodiments and features in the embodiments of the disclosure can be combined with each other without conflict. Below, the disclosure will be described in detail with reference to the attached drawings and in conjunction with embodiments.

Figure 1:
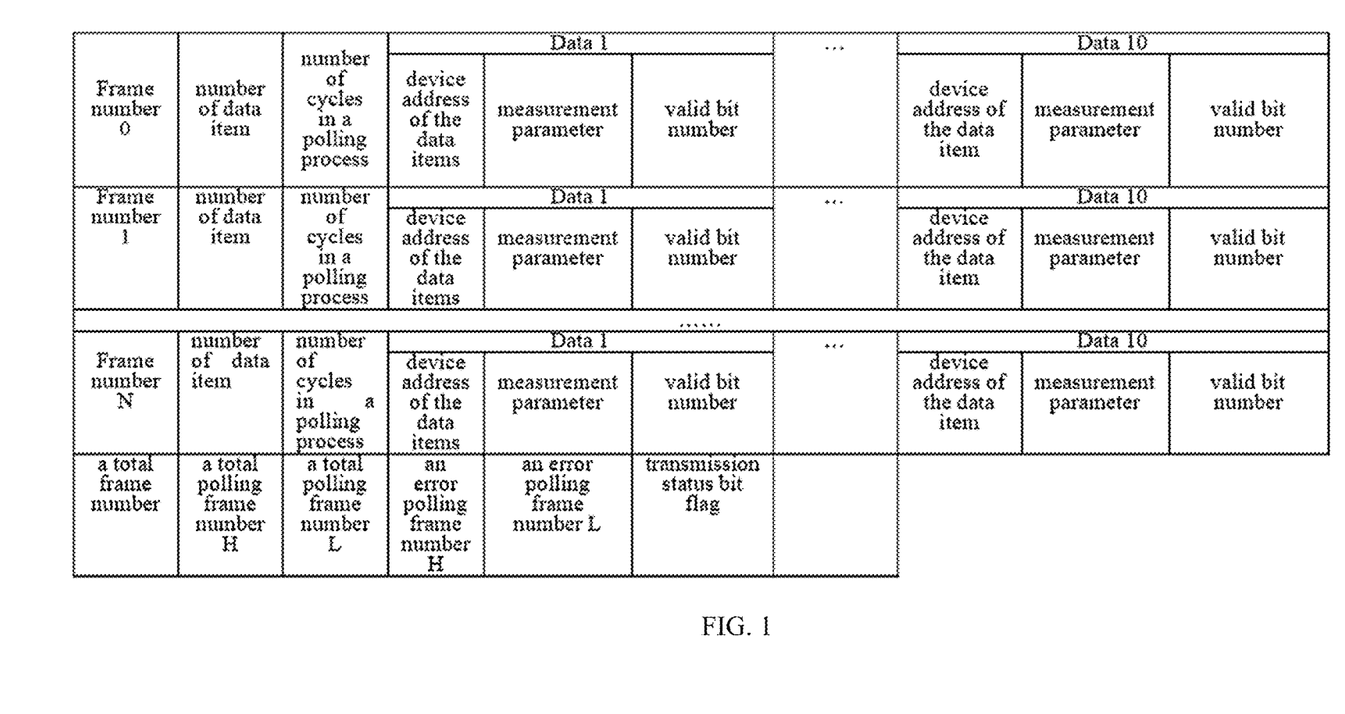
FIG. 1 illustrates a schematic view of a service table of the disclosure.

The service table architecture proposed in the embodiment of the disclosure is shown in FIG. 1. The service table stores information including a frame number, a number of data configured for the data frame (i.e., a number of data items of the data frame), a number of cycles for the data frame in a polling, device address of each of the data items, a measurement parameter, a valid bit number, a valid byte number of the data frame, a total frame number, a total polling frame number H and a total polling frame number L, an error polling frame number H and an error polling frame number L, and a transmission status bit flag. Each item of the configuration information is configured using one byte, and the specific meanings of each item of configuration information in the service table architecture are as follows:

The frame number is configured to identify a data frame for downhole transmission. After the central controller polls and obtains the data configured for the data frame, it sends all the data to the downhole transmission device by frame. Under this service table architecture, a total of 256 frame numbers can be configured.

The number of data items of the data frame is configured to indicate the number of the data items configured for the data frame and configured for uploading, and each data frame of data items can be configured with up to 10 data items.

The number of cycles for the data frame in a polling process is configured to indicate a number of times of sending the data frame to the downhole transmission devices for uploading the data frame to a ground device during the polling process. A byte of the cycles for the data frame indicates the number of cycles for the data frame in the polling, achieving the purpose of multiple transmissions with a single configuration.

The device address of each of the data items is configured to identify a target underground device of the downhole transmission devices from which the data item is obtained. In the data items, from data 1 to data 10, each data item includes three bytes that need to be configured. The bytes configure the address number of the device for downhole transmission device identification. Under the architecture, up to 256 devices can be configured.

The measurement parameters: since the same downhole transmission device may have multiple data items that need to be uploaded to the surface, after configuring the device address where the data is located, the measurement parameter is configured to indicate a parameter of the target underground device corresponding to the data item. This is used for the downhole transmission device identification. Under the architecture, each device can have up to 256 parameters.

The valid bit numbers: the data sent from the downhole transmission device to the central controller is transmitted in bytes as the smallest unit. However, some data does not require a whole number of bytes. For example, a range of azimuth data is from 0° to 360°, which only requires 9 bits, but the downhole transmission device sends it as 16 bits. This results in the high-order 7 bits of the 16 bits being all 0s. If not processed, the downhole transmission device would send all the high-order 7 bits of 0s to the surface, causing waste of the transmission channel and reducing transmission efficiency. The valid bit number is configured to indicate a bit number of the data item after discarding a high-order invalid zero of the data item. The central controller, based on the valid bit number of the data, removes the high-order invalid 0s and then splices multiple data from the same frame number to form new data before sending it to the downhole transmission device, thereby achieving data compression and improving the transmission efficiency of the downhole transmission device.

The valid byte number of the data frame: the valid byte numbers in the data frame are used in conjunction with the valid bit numbers of the data. After completing the data splicing and compression based on the valid bit numbers, the encapsulation of the entire frame number in integer bytes is then completed according to the valid byte numbers in the frame number, and subsequently sent to the downhole transmission device in units of bytes.

The total frame number is configured to indicate a total number of data frames configured in the service table, and configured to determine a number of data frames in the polling process. A cycle begins with frame number 0 and ends with the last frame number N, after which the next polling cycle commences.

The total polling frame number H and the total polling frame number L: before the device is lowered into a well, the two bytes of the total polling frame number H and the total polling frame number L are configured as 0, and configured to record a number of data frames sent to the downhole transmission devices for polling monitoring by the central controller, thereby performing polling monitoring of the central controller.

The error polling frame number H and the error polling frame number L: before the device is lowered into the well, the two bytes of the error polling frame number H and the error polling frame number L are configured as 0, and are configured to record a number of data frames with polling errors for the polling monitoring by the central controller, thereby performing polling monitoring of the central controller. The polling errors include polling device response timeout or polling device data reception error.

The transmission status bit flag: the configuration of a byte of transmission status bit flag is used to indicate whether a downhole status needs to be uploaded, including monitoring information such as a downhole transmission device bus voltage, a downhole transmission device bus current, and determining whether data polling of the central controller is normal, and when configured to determine whether there is a fault, a drilling process is stopped when the fault is detected. When the byte is set to 0, monitoring is not required, saving downhole transmission resources. when set to 1, monitoring is required. The configuration information that needs monitoring should be confirmed in advance and is not configured in the service table.

Figure 2:
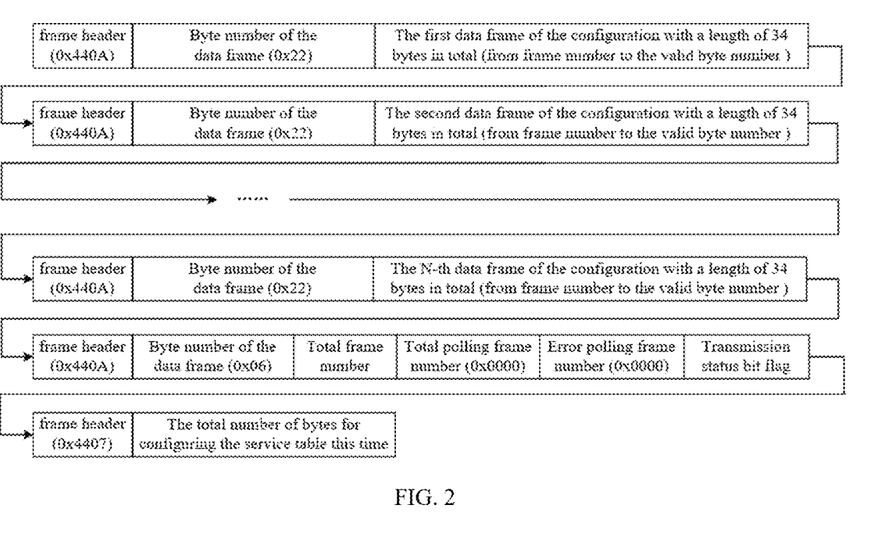
FIG. 2 illustrates data in the service table downloaded into a ROM of a central controller in the disclosure.
Figure 3:
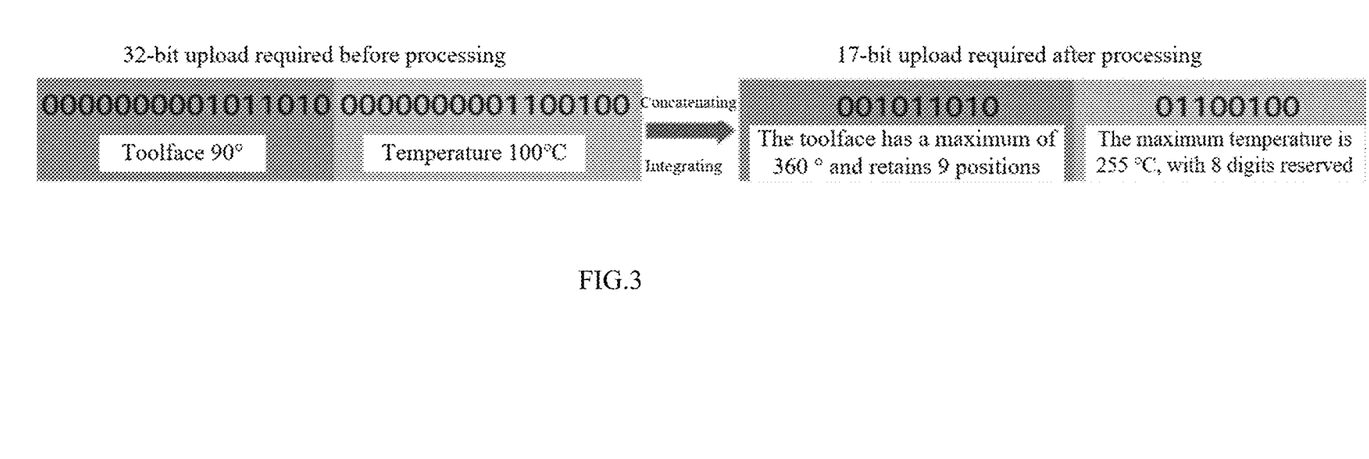
FIG. 3 illustrates a schematic diagram of concatenating and integrating processing the data of the disclosure.

The step of the service table of the disclosure in practical engineering use is as follows:

Step 1, before the downhole transmission devices are lowered into a well, the data of the downhole transmission devices required for the drilling process is determined based on the data of the downhole transmission devices, and the service table is configured, and then the service table is downloaded into a read-only memory (ROM) of the central controller, followed by saving the service table in the ROM. The downloading the service table into the ROM of the central controller is as shown in FIG. 2. The service table is downloaded and saved in bytes. When the service table is saved in the ROM, a frame header of each data frame in the service table, a byte number of the data frame in the service table, and a total byte number of the service table are not stored and are only used for auxiliary counting when the central controller downloads the service table. The first data frame with a frame number 0x00 and the second data frame with a frame number 0x01 are the pump startup sequences, which are uploaded only once after a downhole transmission device assembly is powered up. Data frames from the third data frame with a frame number 0x02 to a last frame in the service table are cyclic sequences, and after the pump startup sequences are sent, the cyclic sequences are sent in a cyclic manner, repeatedly. Further, it should be noted that, the central controller further includes a processor electrically connected to the ROM.

Step 2, after downloading the service table into the ROM of the central controller and saving the service table in the ROM, the downhole transmission devices are lowered in the well to start the drilling process, followed by initiating the central controller to wait for a first data acquisition command from the downhole transmission devices, and upon receiving the first data acquisition command from the downhole transmission devices, a first data frame in the service table is taken as a target data frame and performing step 3.

Step 3, the data of the downhole transmission devices is polled by the central controller according to the target data frame in the service table, followed by beginning with a first data item that needs to be acquired of data items of the target data frame and ending with a last data item that needs to be acquired of the data items of the target data frame, instructions are sent to the downhole transmission devices to request corresponding data one by one, and the data items of the target data frame are acquired from the downhole transmission devices.

Step 4, after acquiring the data items of the target data frame, the data items of the target data frame are concatenated and integrated according to a valid bit number of each of the data items of the target data frame and a valid byte number of the target data frame to obtain a target processed data frame.

Step 5, after concatenating and integrating the data items of the target data frame to obtain the target processed data frame, the target processed data frame is encapsulated according to a protocol to obtain a target encapsulated data frame, the target encapsulated data frame corresponding to the target data frame is sent to the downhole transmission devices for uploading to the ground device. Whether the polling process for the target data frame is completed is determined, and in response to the polling process for the target data frame being completed, a total polling frame number and an error polling frame number of the target data frame are recorded, followed by updating the total polling frame number and the error polling frame number in the service table.

Step 6, after sending the target encapsulated data frame of the target data frame to the downhole transmission devices, the central controller waits for a second data request command from the downhole transmission device. Upon receiving the second data acquisition command from the downhole transmission devices, each of remaining data frames is taken after the target data frame in the service table as the target data frame and the steps 3, 4, and 5 are repeatedly performed until all data frames in the service table are sent to the downhole transmission devices.

Step 7, whether the working status of the downhole transmission devices is needed to be sent is determined based on the configuration information in the service table. In response to the working status of the downhole transmission devices being needed to be sent, monitoring information including a downhole transmission device bus voltage, a downhole transmission device bus current, and whether the polling process performed by the central controller is normal is sent.

Step 8, a third data frame in the service table is taken as the target data frame, and the steps 3 to 7 are repeatedly performed, as pump startup sequences, in the service table.

A testing platform is established to verify and test the service table architecture proposed in the disclosure. The testing platform includes a key circuit system of the downhole transmission device, the central controller for polling, and a bus circuit system for device connection. Key circuits of attitude measurement devices and gamma logging devices are used to simulate downhole transmission devices for working tests of the service table architecture.

The attitude measurement device is assigned an address number of 0x18, and the gamma logging device is assigned an address number of 0x0C for this test. A total of 4 frame numbers are downloaded in the service table. It is necessary to obtain seven parameters from the attitude measurement device, including well inclination, azimuth, toolface, and temperature, as well as the formation gamma values measured by the gamma logging device. The first and second frame numbers are the pump start sequences, which are sent once after powering up, and the third and fourth frame numbers are the cyclic sequences, which are sent in the cyclic manner, repeatedly. The specific configuration of the service table is as follows:

44 0A 22 00 07 01 18 01 11 18 02 11 18 03 11 18 04 11 18 05 11 18 06 11 18 07 11 00 00 00 00 00 00 00 00 00 0F 44 0A 22 01 07 01 18 01 11 18 02 11 18 03 11 18 04 11 18 05 11 18 06 11 18 07 11 00 00 00 00 00 00 00 00 0F 44 0A 22 02 03 01 18 03 11 18 05 11 0C 01 11 00 00 00 00 00 00 00 00 00 00 00 00 00 00 00 00 00 00 00 07

44 0A 22 03 05 01 18 03 11 18 01 11 18 02 11 18 06 11 18 05 11 00 00 00 00 00 00 00 00 00 00 00 00 00 0B 44 0A 06 04 00 00 00 00 01

44 07 00 88

Figure 4:
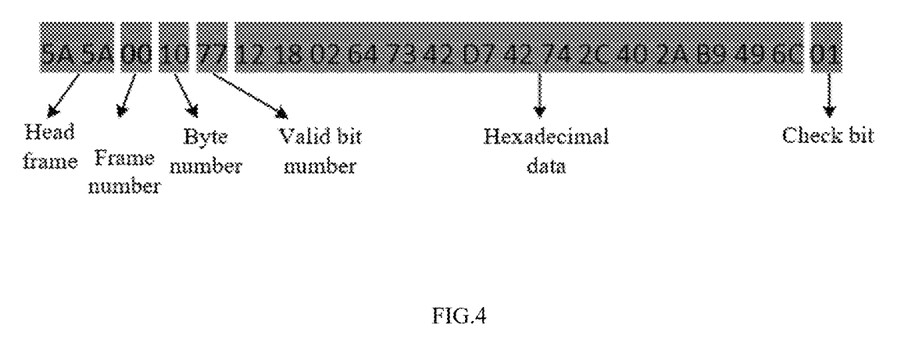
FIG. 4. illustrates a format of data sent by the central controller to an underground transmission device according to an embodiment of the disclosure.

According to the configured service table, the testing platform is powered on and running, while monitoring the data interaction between the downhole transmission device and the central controller to verify whether the application of the service table has achieved the expected effect. The monitoring results are all displayed in hexadecimal, and the data format sent from the central controller to the downhole transmission device is shown in FIG. 4.

The monitoring results are as follows, where 0x50 is the data acquisition command sent by the downhole transmission device, followed by the data sent from the central controller to the downhole transmission device.

[2023 Apr. 20 16:37:23.594] #SEND HEX>
50 (0x50 is the data request command for downhole transmission device.)
[2023 Apr. 20 16:37:25.565] #RECV HEX>
5A 5A 00 10 77 12 18 02 64 73 42 D7 42 74 2C 40 2A B9 49 6C 01 (The first data frame returned by the central controller)
[2023 Apr. 20 16:37:33.686] #RECV HEX>
50
[2023 Apr. 20 16:37:35.665] #RECV HEX>
5A 5A 01 10 77 84 03 84 02 26 33 68 38 B9 3A 01 00 00 1C 02 BE (The second data frame returned by the central controller)
[2023 Apr. 20 16:37:41.257] #RECV HEX>
50
[2023 Apr. 20 16:37:42.717] #RECV HEX>
5A 5A 02 08 33 C9 0C 4C 27 02 00 00 95 (The third data frame returned by the central controller)
[2023 Apr. 20 16:37:46.441] #RECV HEX>
50
[2023 Apr. 20 16:37:48.154] #RECV HEX>
5A 5A 03 0C 55 C9 0C 08 07 0C 05 28 00 D0 37 11 47 (The fourth data frame returned by the central controller)
[2023 Apr. 20 16:37:50.236] #RECV HEX>
50
[2023 Apr. 20 16:37:51.305] #RECV HEX>
5A 5A 0E 02 02 00 0E (A normal operation indicator of the downhole transmission device returned by the central controller)
[2023 Apr. 20 16:38:19.262] #RECV HEX>
50
[2023 Apr. 20 16:38:20.722] #RECV HEX>
5A 5A 02 08 33 C9 0C 42 27 00 00 00 99 (Starting a next polling cycle from the third data frame)
[2023 Apr. 20 16:38:49.080] #RECV HEX>
50
[2023 Apr. 20 16:38:50.790] #RECV HEX>
5A 5A 03 0C 55 C9 0C 08 07 14 05 28 00 B0 37 11 3F
[2023 Apr. 20 16:38:51.955] #RECV HEX>
50
[2023 Apr. 20 16:38:53.028] #RECV HEX>
5A 5A 0E 02 02 00 0E
[2023 Apr. 20 16:38:53.944] #RECV HEX>
50
[2023 Apr. 20 16:38:55.405] #RECV HEX>
5A 5A 02 08 33 C9 0C 0C 27 00 00 00 D7

The service table architecture proposed by the disclosure for polling data of a downhole transmission device in MWD has been used in actual drilling devices and has completed field operations for multiple wells. Compared to the simplified service tables in the past, the service table proposed by the disclosure can support multiple downhole transmission devices working simultaneously, which has improved drilling efficiency and saved drilling costs.

The above is only a specific embodiment of the disclosure, but the scope of protection of the disclosure is not limited to this. Any equivalent substitution or modification based on the technical solution and inventive concept disclosed in the disclosure should be included in the scope of protection of the disclosure.

What is claimed is:

1. A method for polling data of downhole transmission devices in measurement-while-drilling (MWD) comprising:
    step 1, before the downhole transmission devices are lowered into a well, determining the data of the downhole transmission devices required for a drilling process; based on the data of the downhole transmission devices, and configuring a service table and then downloading the service table into a read-only memory (ROM) of a central controller and saving the service table in the ROM;
    step 2, after downloading the service table into the ROM of the central controller and saving the service table in the ROM, lowering the downhole transmission devices in the well to start the drilling process, followed by initiating the central controller to wait for a first data acquisition command from the downhole transmission devices;
    step 3, upon receiving the first data acquisition command by the central controller from the downhole transmission devices, taking a first data frame in the service table as a target data frame, polling the data of the downhole transmission devices by the central controller according to the target data frame in the service table, beginning with a first data item that needs to be acquired of data items of the target data frame and ending with a last data item that needs to be acquired of the data items of the target data frame, sending instructions to the downhole transmission devices to request corresponding data one by one, and acquiring the data items of the target data frame from the downhole transmission devices;
    step 4, after acquiring the data items of the target data frame, concatenating and integrating the data items of the target data frame according to a valid bit number of each of the data items of the target data frame and a valid byte number of the target data frame to obtain a target processed data frame, wherein the valid bit number is configured to indicate a bit number of a data item after discarding a high-order invalid zero of the data item, the high-order invalid zero is removed by the central controller based on the valid bit number, and multiple data from a same frame are spliced to form new data;

step 5, after concatenating and integrating the data items of the target data frame to obtain the target processed data frame, encapsulating the target processed data frame according to a protocol to obtain a target encapsulated data frame, sending the target encapsulated data frame corresponding to the target data frame to the downhole transmission devices for uploading to a ground device; determining whether a polling process for the target data frame is completed, in response to the polling process for the target data frame being completed, recording a total polling frame number and an error polling frame number of the target data frame, and updating the total polling frame number and the error polling frame number in the service table;

step 6, after sending the target encapsulated data frame of the target data frame to the downhole transmission devices, waiting for, by the central controller, a second data acquisition command from the downhole transmission devices; upon receiving the second data acquisition command from the downhole transmission devices, taking each of remaining data frames after the target data frame in the service table as the target data frame and repeatedly performing the steps 3, 4, and 5 until all data frames in the service table are sent to the downhole transmission devices;

step 7, determining whether a working status of the downhole transmission devices is needed to be sent based on configuration information in the service table; in response to the working status of the downhole transmission devices being needed to be sent, sending monitoring information comprising a downhole transmission device bus voltage, a downhole transmission device bus current, and whether the polling process performed by the central controller is normal; and step 8, taking a third data frame in the service table as the target data frame, and repeatedly performing the steps 3 to 7, without resending the first date frame and a second data frame, as pump startup sequences, in the service table;

wherein the service table comprises the configuration information as follows:
  a frame number, configured to identify a data frame for downhole transmission;
  a number of data items of the data frame, configured to indicate the number of the data items of the data frame configured for the data frame and configured for uploading;
  a number of cycles of the data frame in the polling process, configured to indicate a number of times of sending the data frame to the downhole transmission devices for uploading the data frame to the ground device during the polling process;
  a device address of each of the data items of the data frame, configured to identify a target underground device of the downhole transmission devices from which the data item is obtained;
  a measurement parameter, configured to indicate a parameter of the target underground device corresponding to the data item;
  the valid bit number, configured to indicate the bit number of the data item after discarding the high-order invalid zero of the data item;
  the valid byte number of the data frame, configured to indicate a byte number of the data frame after the data frame is concatenated, compressed and encapsulated;
  a total frame number, configured to indicate a total number of data frames configured in the service table, and configured to determine a number of data frames in the polling process;
  a total polling frame number H and a total polling frame number L, configured to record a number of data frames sent to the downhole transmission devices for polling monitoring by the central controller;
  an error polling frame number H and an error polling frame number L, configured to record a number of data frames with polling errors for the polling monitoring by the central controller; and
  a transmission status bit flag, configured to indicate whether the working status of the downhole transmission devices needs to be uploaded, and configured to determine whether there is a fault; wherein a drilling process is stopped when the fault is detected;
  wherein each item of the configuration information is configured using one byte;
  wherein the total polling frame number H, the total polling frame number L, the error polling frame number H and the error polling frame number L are configured as 0 before the downhole transmission devices are lowered into the well;
  wherein the polling errors comprise polling device response timeout or polling device data reception error; and
  wherein the working status comprises the downhole transmission device bus voltage, the downhole transmission device bus current, and the whether the polling process performed by the central controller is normal.

2. The method for polling the data of the downhole transmission devices in MWD as claimed in claim 1, wherein downloading the service table into the ROM of the central controller and saving the service table in the ROM comprises:
  when the service table is saved in the ROM, no storing a frame header of each data frame in the service table in the ROM, no storing the byte number of the data frame in the service table in the ROM, no storing a total byte number of the service table in the ROM, and using the frame header of each data frame in the service table, the byte number of the data frame in the service table, and the total byte number of the service table for only auxiliary counting when the central controller downloads the service table;
  wherein the first data frame with a frame number 0x00 and the second data frame with a frame number 0x01 are the pump startup sequences, which are uploaded only once after a downhole transmission device assembly is powered up; data frames from the third data frame with a frame number 0x02 to a last frame in the service table are cyclic sequences, and after the pump startup sequences are sent, the cyclic sequences are sent in a cyclic manner, repeatedly.

* * * * *